US006909908B2

(12) United States Patent
Payne et al.

(10) Patent No.: US 6,909,908 B2
(45) Date of Patent: Jun. 21, 2005

(54) PLAIN ORDINARY TELEPHONE LINE AND LOCAL AREA NETWORK CONNECTIONS FOR MOBILE PHONES

(75) Inventors: David M. Payne, Meridian, ID (US); Thomas A. Killingsworth, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 613 days.

(21) Appl. No.: 09/776,054

(22) Filed: Feb. 2, 2001

(65) Prior Publication Data

US 2002/0106994 A1 Aug. 8, 2002

(51) Int. Cl.[7] .................................................. H04Q 7/20

(52) U.S. Cl. ...................................................... 455/557

(58) Field of Search ............................. 455/557, 556.1, 455/556.2, 66.1, 74, 74.1

(56) References Cited

U.S. PATENT DOCUMENTS 6,021,310 A * 2/2000 Thorne ...................... 340/7.54
6,283,775 B1 * 9/2001 Shupe et al. ................ 439/188
6,459,778 B1 * 10/2002 Shirai ...................... 379/93.29
6,603,965 B1 * 8/2003 Dinkin ....................... 455/416
2002/0065076 A1 * 5/2002 Monroe ...................... 455/426

* cited by examiner

*Primary Examiner*—Lee Nguyen

(57) ABSTRACT

A mobile phone handset has incorporated connectors and/or circuitries to connect to plain ordinary telephone (POT) lines, various computing devices and/or a local area network (LAN). The POT line connection, e.g., a RJ-11 type connector, and the relevant circuitries allow a user of the mobile phone handset to utilize many convenience enhancement features of the mobile phone handset while at the same time taking advantage of the cheaper rate in making a telephone call over the POT line. In addition, the LAN connections and the connections to other computing devices allow the user to access the Internet (e.g., the e-mail network and/or the world-wide-web (WWW)) at a cheaper rate than the wireless access to the Internet, and may provide a better user interface.

20 Claims, 6 Drawing Sheets

PLAIN ORDINARY TELEPHONE LINE AND LOCAL AREA NETWORK CONNECTIONS FOR MOBILE PHONES

TECHNICAL FIELD

The present invention generally relates to mobile and computer communication. More particularly the present invention relates to providing plain ordinary telephone line and local area network communication capabilities in wireless communication devices.

BACKGROUND ART

In the recent years, with a society which is becoming increasingly mobile, and with the ever-increasing need for communications, wireless communication services, particularly mobile or cellular phone services, have gained wide popularity. Use of a mobile phone has now become an ubiquitous part of the modern society.

Since their introduction, mobile phone handsets nowadays provide many enhancement features, which may include, e.g., a telephone number directory database, caller identification, voice activated and/or speed dialing. The enhancement features provide much more convenient and faster ways in which a call can be made.

Unfortunately, however, the conventional mobile phone handsets suffer from many shortcomings that prevent a user from taking full advantage of the enhancement features, particularly when the user has a ready access to a land-line telephone service—also referred to as a plain ordinary telephone (POT) service, e.g., through conventional wired public switched telephone network (PSTN). For example, when the mobile phone user is in an office, home or otherwise near a POT device, the mobile phone user typically prefers to use the POT service offered at much cheaper rate rather than the mobile phone service, for which the user may have to pay much higher rate. In this case, the user is typically required to juggle two different telephone devices, e.g., to obtain a telephone number from the directory in the mobile phone handset, and to use the POT device to actually dial and make a call. It is desirable to allow a user of a mobile phone handset to utilize the enhancement features of the mobile handset even when the user is making a call through the POT network.

Moreover, more recently, mobile phone handsets have become "web enabled". That is, a user of a web enabled mobile phone handset may access the Internet, e.g., the electronic mail (e-mail) system and the world-wide web (WWW) through a wireless communication network, using in particular the wireless application protocol (WAP). However, because of the size and/or weight constraint, the mobile phone handsets do not offer a convenient and practical user interface. It would thus be desirable to provide a better user interface means when a user is accessing the Internet through a mobile phone handset.

Furthermore, it would be desirable to provide a mobile telephone handset a capability to connect to various devices, e.g., a global positioning system device, computing devices (e.g., personal digital assistants (PDA), personal computers or the like), and even to a local area network, which may provide a more cost effective access to the Internet than the wireless communication network.

Thus, there is a need for a mobile phone handset capable of being utilized over a plain ordinary telephone line, and which is capable of communicating with various computing devices and networks.

SUMMARY OF INVENTION

In accordance with the principles of the present invention, a mobile phone handset comprises a connector configured to connect the mobile phone handset to at least one of a plain ordinary telephone line, a local area network and one or more computing devices.

In accordance with another aspect of the principles of the present invention, a method of mobile communication comprises providing a mobile phone handset having a connector configured to connect the mobile phone handset to at least one of a plain ordinary telephone line, a local area network and one or more computing devices, and allowing a user to operate the mobile phone handset utilizing at least one of connected ones of the at least one of a plain ordinary telephone line, a local area network and one or more computing devices.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplary embodiment thereof, particularly with references to an example in which specific circuit block arrangement of the mobile phone handset is describe. However, one of ordinary skill in the art would readily recognize that the same principles are equally applicable to, and can be implemented in, any other circuit block arrangements and configurations thereof, and that any such variation would be within such modifications that do not depart from the true spirit and scope of the present invention.

In accordance with the principles of the present invention, a mobile phone handset has incorporated connectors and/or circuitries to connect to plain ordinary telephone (POT) lines, various computing devices and/or a local area network (LAN), e.g., an Ethernet network through a RJ-45 type connection. The POT line connection, e.g., a RJ-11 type connection, and the relevant circuitries allow a user of the mobile phone handset to utilize many convenience enhancement features of the mobile phone handset while at the same time taking advantage of the cheaper rate in making a telephone call over the POT line. In addition, the LAN connections and the connections to other computing devices allow the user to access the Internet (e.g., the e-mail network and/or the world-wide-web (WWW)) at a cheaper rate than the wireless access to the Internet, and may provide a better user interface.

Figure 1:
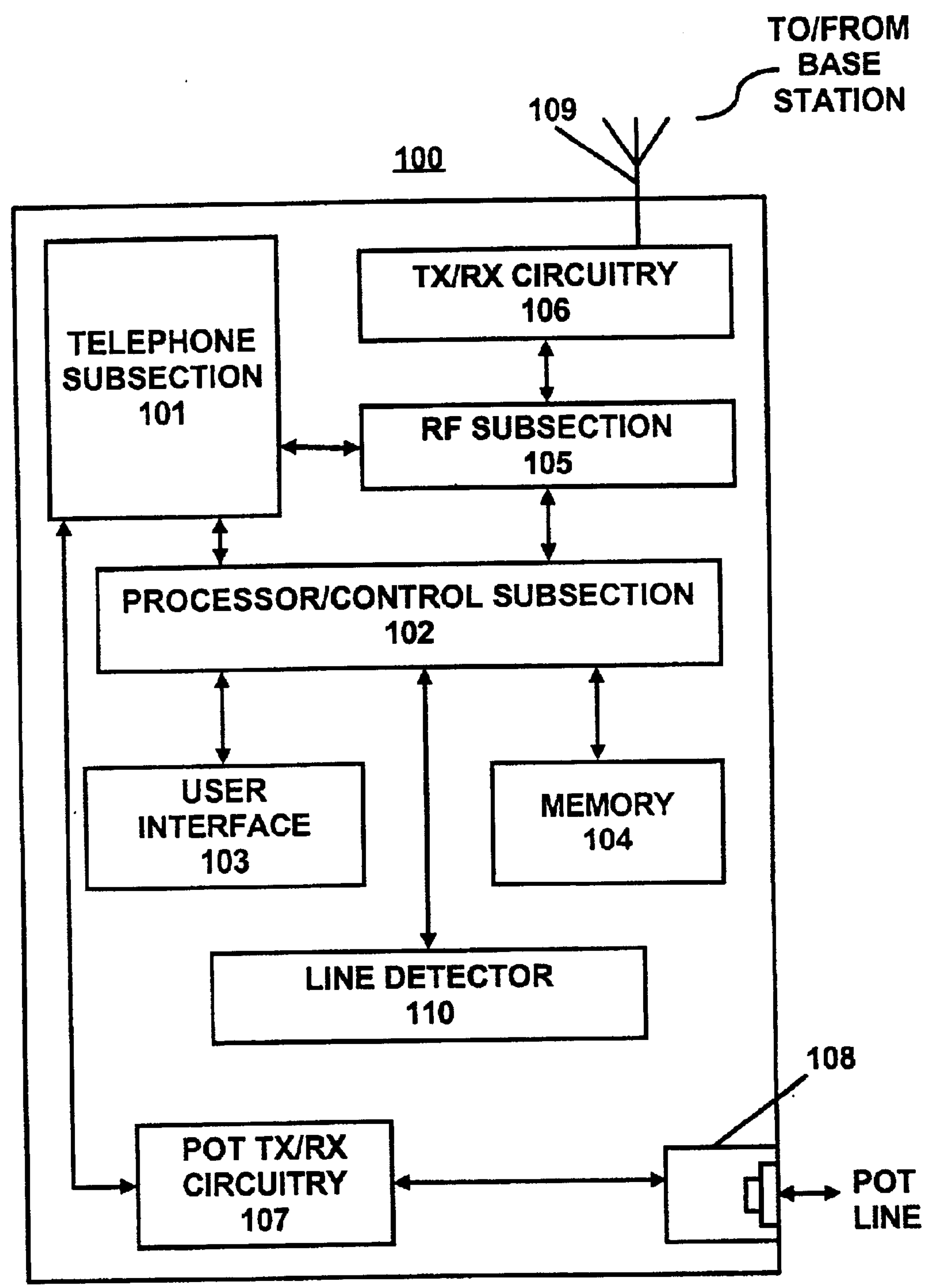
FIG. 1 shows an exemplary embodiment of the mobile telephone handset capable of connecting to, and capable of being operable through, an ordinary telephone line in accordance with the principles of the present invention.

In particular, FIG. 1 shows an exemplary embodiment of the mobile telephone handset 100 capable of connecting to, and capable of being operable through, an ordinary telephone line in accordance with the principles of the present invention. The mobile phone handset 100 may comprise various conventional mobile phone components, which may include: a telephone subsection 101, a processor/control subsection 102, a user interface 103, a storage memory 104, a radio frequency (RF) subsection 105 and RF transmission/receiver (Tx/Rx) subsection 106, all of which are typically included in a conventional mobile phone handset as known to those familiar with conventional mobile phone handsets. Briefly, as is known to those having ordinary skill in the art, the conventional telephone subsection 101, under control of the processor/control subsection 102, converts user voice to electrical signals to be sent to the RF subsection 105 and to convert electrical signals received from the RF subsection 105 into voice that can be heard by the user, and may include microphone(s) (not shown), speaker(s) (not shown), transducer(s) (not shown), tone generator(s) (not shown) or the like necessary to carry out the conversions. The RF subsection 105 converts the electrical signals received from the telephone subsection 101 into RF signals, which is sent to a base station (BS) of a mobile or wireless communication network by the Tx/Rx subsection 106 and through the antenna 109. In addition, the RF subsection 105 converts RF signals received from the base station via the antenna 109 and the Tx/Rx subsection 106 to electrical signals to be processed by the telephone subsection 101.

A conventional mobile phone handset typically includes a user interface 103, which may comprise a keypad to allow a user to enter phone numbers, initiate mobile call and/or access a directory database stored in a memory 104. The user interface 103 typically also includes a display (not shown), e.g., a liquid crystal display (LCD) to allow the user to view relevant information with regard to the operation of the mobile phone handset.

The memory 104 typically has stored therein a user preference/configuration information of the particular handset. The memory 104 may also have stored thereon a telephone directory, which may include, inter alia, e.g., phone numbers, names or the like of people, whom the user may call or receive calls from. The user typically presses various keys in the user interface 103 to access the telephone directory, and is shown a display of the relevant directory information in the display of the user interface. Some modern mobile phone handset may even allow the user to "speed dial" the called party, corresponding directory information of whom is shown in the display, without having to manually enter the telephone number through the keypad.

The processor/control subsection 102 supervises each of the conventional components to carry out the proper operation of the handset, and may include one or more microprocessors and computer programs.

In accordance with an embodiment of the present invention, the mobile phone handset 100, in addition to the above described conventional mobile phone components, may further comprise a POT line connector 108, which may be, e.g., a RJ-11 type connector or the like typically used in POT line connections, and known to those familiar with telephone line connections, to provide the handset 100 with a capability to connect to a POT line. The mobile phone handset 100 may also include a POT transmitter/receiver circuitry (POT Tx/Rx Circuitry) 107 that converts electrical signals received from the telephone subsection 101 to modulated signals suitable for transmitting over a POT line, and that converts signal received from the POT line into electrical signal that the telephone subsection 101 can recognize. The POT Tx/Rx Circuitry 107 may be of the kind that is typically included in a POT devices, and which is known to those familiar with the workings of plain ordinary telephones.

The mobile phone handset 100 further comprises a line detector 110 which detects whether the POT line connector 108 is connected to a POT line, by for example, detecting the presence of signals being received by the POT line connector 108 from the POT line, if any. In accordance with this exemplary embodiment, when the line detector 110 detects the presence of POT line connection, the line detector 110 sends a "POT_Line_Present" signal to the processor/control subsection 102, which is modified to include functions, which may be implemented as software, hardware or a combination thereof, for causing the telephone subsection 101 to send telephone call related electrical signals to, and receive signals from, the POT Tx/Rx circuitry 107, rather than the RF subsection 105 when the POT_Line_Present signal is received.

In this example, when the user initiates a telephone call using the mobile phone handset 100, the call is made through the POT line (if the handset 100 is connected to the POT line) to take advantage of the lower POT line rate. Even when the call is being made over a POT line, the user is allowed to utilize every feature of the handset 100, e.g., directory access, speed dialing and the like.

Figure 1A:
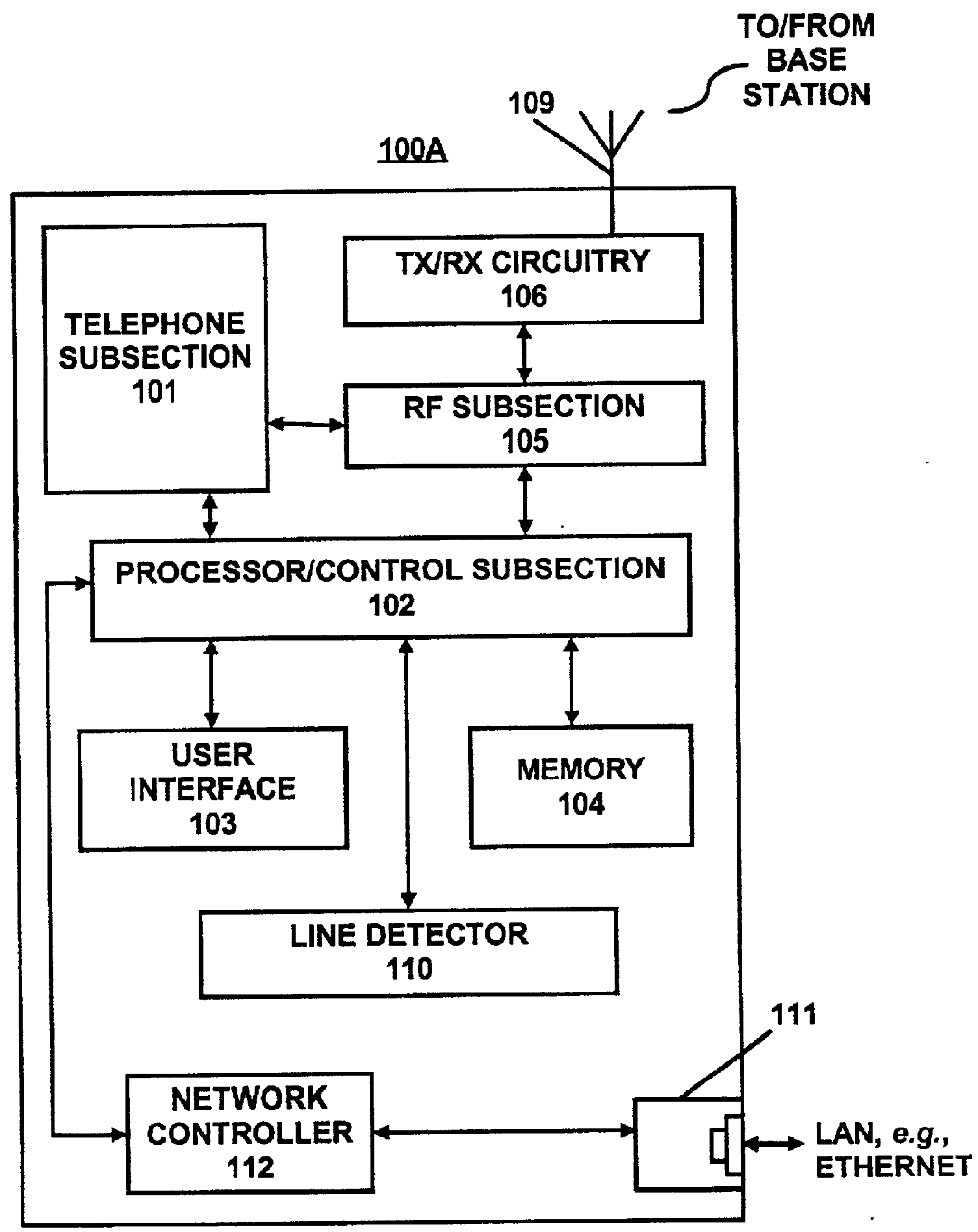
FIG. 1A shows an exemplary embodiment of the mobile telephone handset capable of connecting to, and capable of being operable through, a local area network in accordance with the principles of the present invention.

FIG. 1A shows an alternative exemplary embodiment of the mobile telephone handset 100A, capable of connecting to a local area network (LAN), e.g., an Ethernet network, and which comprises each of the conventional mobile phone components described above—namely a telephone subsection 101, a RF subsection 105, a Tx/Rx subsection 106, a user interface 103, a storage memory 104—, a modified processor/control subsection 102 and a line detector 110 as previously described The line detector 110 of this embodiment sends a "LAN_Connection_Present" signal to the processor control subsection 102 upon detection of signals being received by the LAN connector 111.

In addition, the mobile phone handset 100A further includes a LAN connector 111, which may be for example, a RJ-45 type connector for connecting to an Ethernet network as known to those familiar with LAN connections, and a network controller 112 that allows the processor/control subsection 102 to communicate with other computing device connected to the LAN. The network controller 112 may be an Ethernet controller, which is well known to those familiar with network connections.

In this example, the processor/control subsection 102 includes additional functions, which may be implemented as software, hardware or a combination thereof, for allowing the user to access the LAN using the user interface 103 when the handset 100B is connected to a LAN via the LAN connector 111. For example, a user interface screen may be displayed to the user on the display device of the user interface 103, allowing the user to select, e.g., by pressing one or more keys on the keypad of the user interface 103, various tasks to be performed over the LAN, e.g., reading and/or composing e-mail messages over the LAN, to cause the telephone directory stored in the memory 104 to be printed at a networked printer connected to the LAN, access wide area networks (WAN), e.g., the Internet, via the LAN, or the like.

Figure 1B:
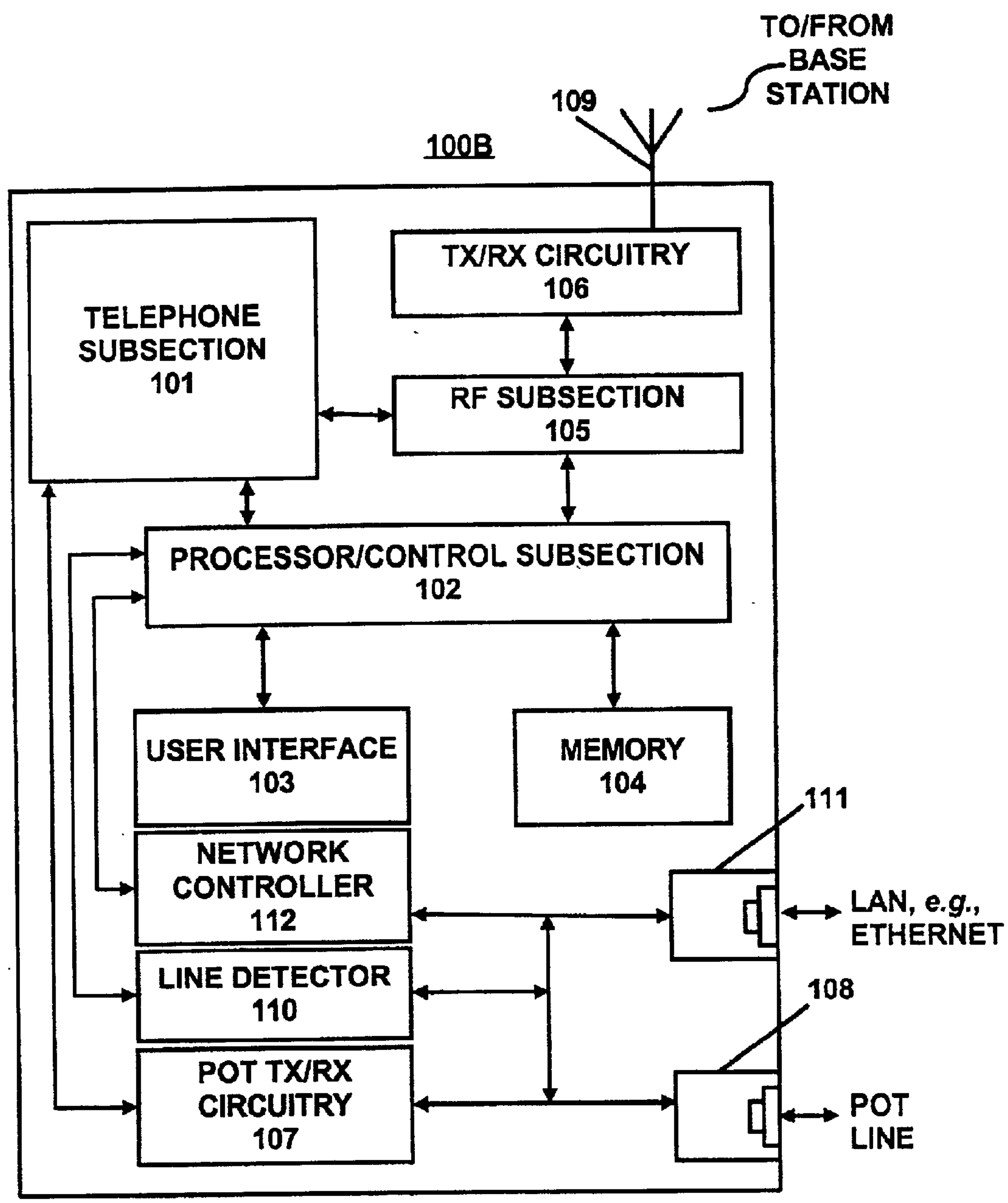
FIG. 1B shows an exemplary embodiment of the mobile telephone handset capable of connecting to, and capable of being operable through, an ordinary telephone line and/or a local are network in accordance with the principles of the present invention.

FIG. 1B shows another alternative exemplary embodiment of the mobile telephone handset 100B, capable of connecting to a LAN and/or a POT line. As shown, the mobile phone handset 100B comprises both a LAN connector 111 and a POT line connector 108, each of which was previously described. The mobile phone handset 100B also comprises a network controller 112 and a POT Tx/Rx circuitry 107, which were also previously described. In this example, the line detector 110 detects the presence of signals being received by both the LAN connector 111 and the POT line connector 108, and sends the POT Line_Present signal and/or the LAN_Connection_Present signal, as appropriate, and as previously described. The mobile phone handset 100B allows a user to make calls over a POT line and/or to access a LAN using the user interface 103 of the handset.

Figure 1C:
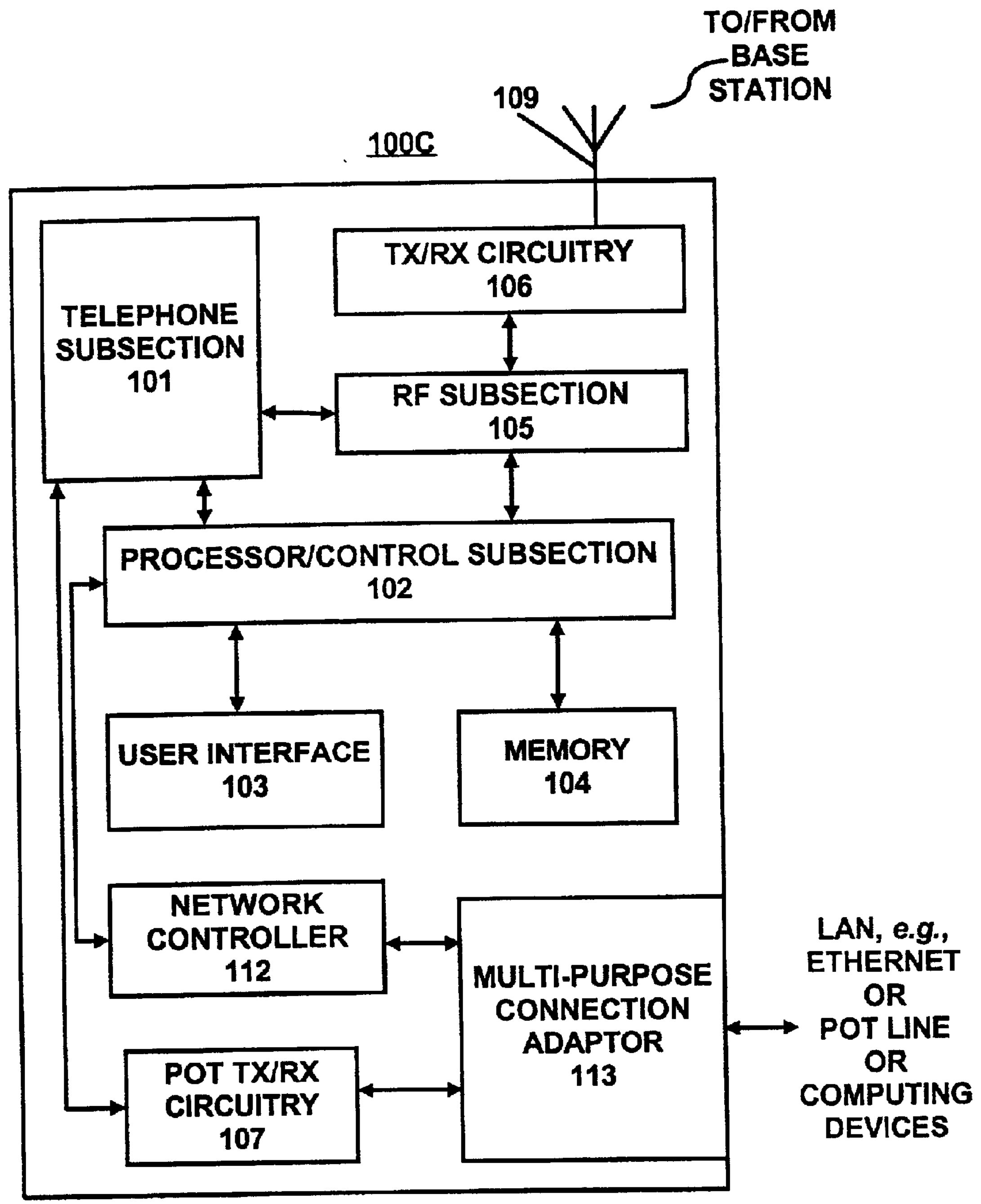
FIG. 1C shows an alternative exemplary embodiment of the mobile telephone handset capable of connecting to, and capable of being operable through, an ordinary telephone line and/or a local are network shown in FIG. 1B.

FIG. 1C shows yet another alternative exemplary embodiment of the mobile phone handset 100C, capable of connecting to a LAN, to a POT line and/or to other computing devices. Each of the telephone subsection 101, RF subsection 105, Tx/Rx subsection 106, user interface 103, storage memory 104, network controller 112 and the POT Tx/Rx circuitry 107 shown in FIG. 1C is as previously described.

Figure 2:
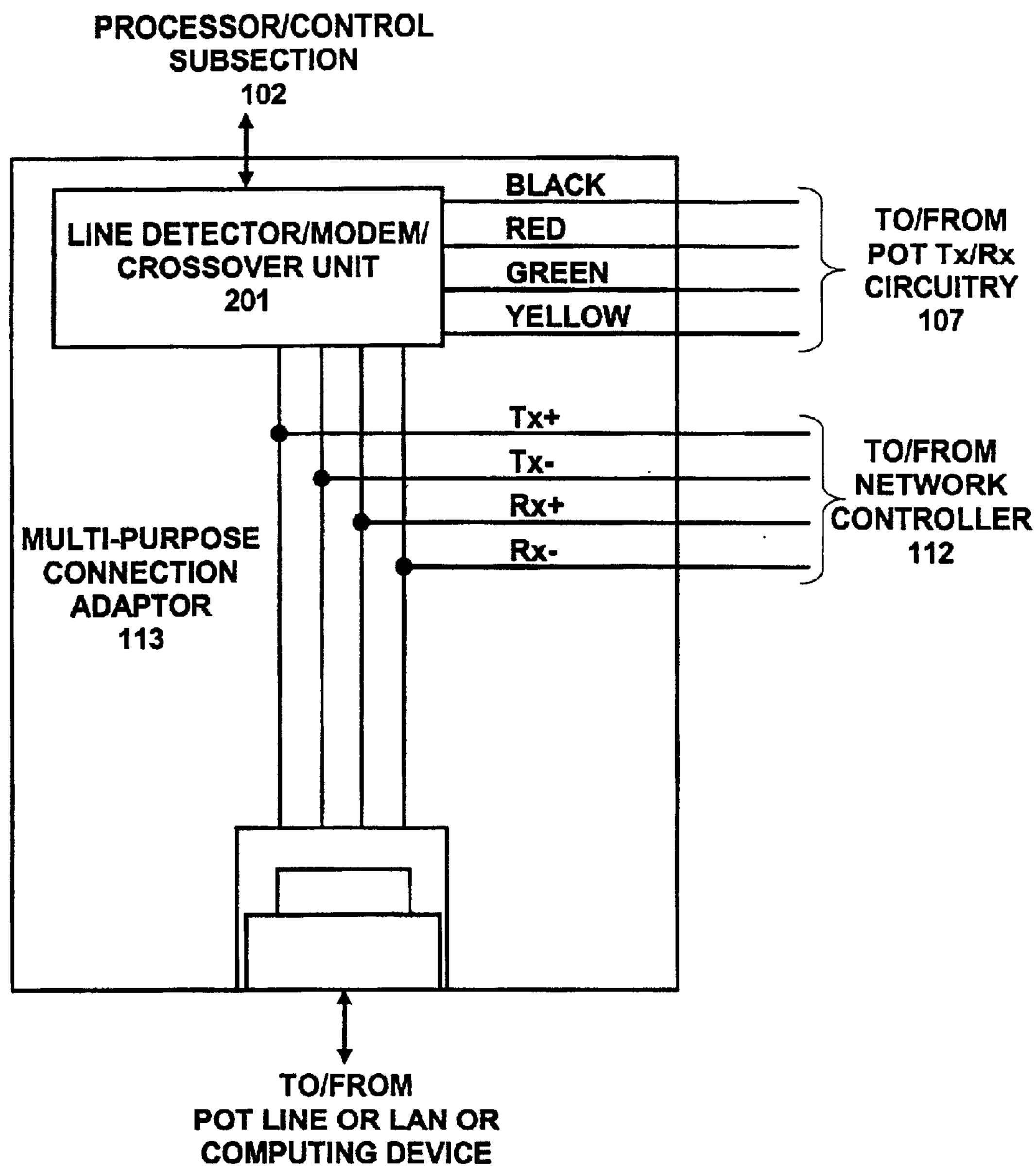
FIG. 2 shows an exemplary embodiment of the multi-purpose connection adaptor shown in FIG. 1C, and in accordance with the principles of the present invention.

In this exemplary embodiment, the mobile phone handset 100C comprises a multi-purpose connection adaptor 113, to which various telephone lines, networks and/or computing devices may be connected. FIG. 2 shows a more detailed diagram of the multi-purpose connection adaptor 113, which is shown to comprise a multi-purpose connector 202 and a line detector/modem/crossover unit 201. The multi-purpose connector 202 may be, e.g., a RJ-45 type connector socket modified to accommodate the male plugs connectors of both the RJ-11 type and the RJ-45 type. Typically, a RJ-45 type connector is physically wider than a RJ-11 connector. The multi-purpose connector 202 may be the size of a RJ-45 connector with appropriate tabs to securely hold a RJ-11 type male plug as well as a RJ-45 type plug.

Typically, the RJ-45 type connector wiring for Ethernet network connections include four wires, a pair of wires for transmission (Tx+ and Tx−) and the other pair for reception (Rx+ and Rx−) of data. In order to accommodate the appropriate order of wires, i.e., the black, red, green and yellow as known to those familiar with POT line wiring, the line detector/modem/crossover unit 201 may need to transpose some of the ordering of the Tx+, Tx−, Rx+ and Rx− wires to present the correct ordering of the wires to the POT TX/Rx circuitry 107. The line detector/modem/crossover unit 201 further comprises a line detector to detect the presence of signals received in the multi-purpose connector 202, and the type of signal, i.e., whether the received signal is from a network device or from the POT line, by, e.g., detecting which of the four wires the signals are being received.

Referring again to FIGS. 1C and 2, upon detection of signal at the multi-purpose connector 202, the line detector/modem/crossover unit 201 sends an appropriate connection present signal to the processor/control subsection 102, apprising the processor/control subsection 102 whether a POT line connection or a LAN connection is present at the multi-purpose connector 202. If a POT line connection is present, the processor/control subsection 102 causes the telephone subsection 101 to send all telephone related electrical signal to the POT Tx/Rx circuitry 107, allowing a user of the mobile phone handset 100C to place a call over the POT line, including the usage of the directory based speed dialing as previously described. Additionally, the user may be provided with an option to access a wide area network (WAN), e.g., the Internet, the world-wide-web or the like, through a dial-up connection over the POT line. When a user chooses to call an internet service provider (ISP) over the POT line, the processor/control subsection 102 causes the modem in the line detector/modem/crossover unit 201 to establish a dial-up connection to the ISP. The dial-up access to the WAN may provide a less expensive alternative to a wireless access, e.g., using a wireless application protocol (WAP).

On the other hand, if a LAN connection is present, the processor/control subsection 102 communicates to the connected LAN devices through the network controller 112, allowing the user of the mobile phone handset 100C to access the LAN from the mobile phone handset 100C. For example, a user interface screen may be displayed to the user on the display device of the user interface 103, allowing the user to select, e.g., by pressing one or more keys on the keypad of the user interface 103, various tasks to be performed over the LAN, e.g., reading and/or composing e-mail messages over the LAN, causing the telephone directory stored in the memory 104 to be printed at a networked printer connected to the LAN, accessing a wide area network (WAN), e.g., the Internet, via the LAN or the like.

In addition, the mobile phone handset 100C allows a user to communicate with various computing devices, e.g., a lap-top or a desktop personal computer, a personal digital assistant (PDA) device, a global positioning system (GPS) device or the like, which have either a network card to communicate with the mobile phone handset 100C using a network communication protocol, e.g., the Ethernet protocol or the like, or a modem to communicate with the mobile phone handset 100C over the POT line connection.

By way of example, and not as a limitation, the capability to connect to the various computing devices may enable a user of the mobile phone handset to utilize the better user interface capability (e.g., a larger display screen and a more convenient input devices including a mouse and a larger keyboard, or the like) of the computing device, e.g., when the user is accessing a wide area network (WAN), e.g., the Internet. A GPS device connected to the mobile phone handset 100C may enable the user to provide the exact geographical location of the user to, e.g., an on-line service provider, and to thus obtain a more geographically relevant information when accessing a wide area network (WAN), e.g., the Internet, through the wireless mobile network.

As can be appreciated, the mobile phone handset 100C provides very versatile connection and/or operation capabilities, allowing a user to make telephone calls via a wireless mobile network or over a POT line, allowing the user to access a wide area network (WAN) via modem dial-up, through a local area network (LAN) or through a wireless mobile network, and allowing the mobile phone handset to communicate with various computing devices having either a modem or a network card.

Although, for brevity, the connectors 108, 111 and 202 in the above description of various embodiments of the mobile handset according to the principles of the present invention are shown to be female type connectors, it should be readily apparent to those skilled in the art, and should be understood that each of the connectors may be a male type connector.

Figure 3:
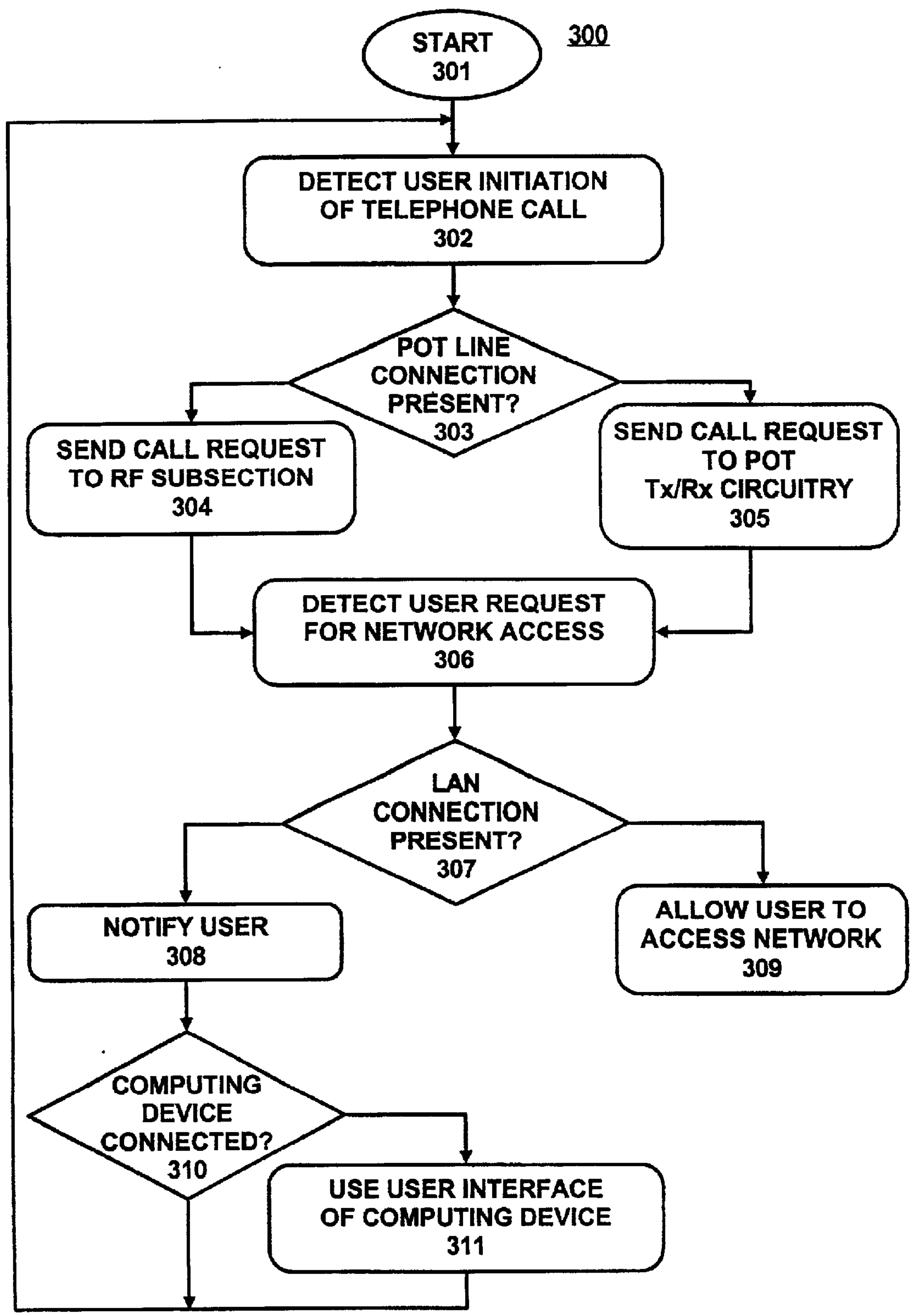
FIG. 3 shows a flowchart illustrative of an exemplary embodiment of the operation process of the mobile phone handset in accordance with the principles of the present invention.

Referring to FIG. 3, an exemplary embodiment of the operation process of the mobile phone handset in accordance with the principles of the present invention will now be explained. The operation of the mobile phone handset (e.g., any of the mobile handsets 100, 100A, 100B and 100C as described above) starts at step 301, when, e.g., the mobile phone handset is powered up. When the processor/control subsection 102 detects an initiation of a telephone call by the user in step 302, a determination whether a POT line connection is present is made in step 303. The determination may be made, e.g., by the processor/control subsection 102 from the presence of an appropriate signal from the line detector 110 (as shown in FIGS. 1, 1A and 1B) or the multi-purpose connection adaptor 113 (as shown in FIG. 1A) as previously described.

If it is determined that a POT line is connected to the mobile phone handset, the processor/control subsection 102 causes the call request and call related electrical signals to be sent from the telephone subsection 101 to the POT Tx/Rx circuitry 107 in step 305. The telephone call is then allowed to be completed over the POT line. As previously described, the call may be made by the telephone directory based speed dialing feature available in the mobile phone handset.

If, on the other hand, it is determined in step 303 that the POT line is not connected to the mobile phone handset, the processor/control subsection 102 causes the call request and call related electrical signals to be sent from the telephone subsection 101 to the RF subsection 105 in step 304. The telephone call is then allowed to be completed over a conventional mobile phone network in the same manner as if a conventional mobile phone handset is used.

When the user requests for a network access in step 306, e.g., by selecting the network access menu selection from the user interface 103, a determination whether a LAN connection is present is made in step 307. The determination may be made, e.g., by the processor/control subsection 102 from the presence of an appropriate signal from the line detector 110 (as shown in FIGS. 1, 1A and 1B) or the multi-purpose connection adaptor 113 (as shown in FIG. 1A) as previously described.

If it is determined that a LAN connection is not present, the user is notified of the lack of LAN connection 308, and may be prompted to provide a connection by engaging LAN cable to the connector 111 (or 202).

If, on the other hand, it was determined that a LAN connection is available, in step 309, the processor/control subsection 102 communicates to the connected LAN devices through the network controller 112, allowing the user of the mobile phone handset to access the LAN from the mobile phone handset, to, e.g., read and/or compose e-mail messages over the LAN, to access a networked printer connected to the LAN, to access wide area networks (WAN) via the LAN or the like.

In step 310, the processor/control subsection 102 determines whether a computing device is connected to the connector (108, 111 or 202), either through a modem or a network card, and if a computing device is connected, then allows the user to utilize the user interface of the computing device in step 311. The process 300 then returns to step 302, and repeats the steps 302 through 311.

Although, in the above description, the various embodiments of the mobile phone handset in accordance with the principles of the present invention are described using examples in which a user is allowed to place a call either through a wireless communication network or through a POT line, it should be understood and readily apparent to those skilled in the art that the user may receive a call from another caller either through the wireless network or a POT line.

In particular, when a call is received through the POT line (i.e., while the mobile phone handset is connected to the POT line), the call related signals from the POT line are received by the POT Tx/Rx circuitry 107, which in turn produces and sends the corresponding electrical signals to the telephone subsection 101, which, under control of the processor/control subsection 102, produces the ring and enables the user of the mobile phone handset to hear the caller's voice. In an embodiment of the present invention, the processor/control subsection 102 causes the caller identification (caller ID) information typically included in the call related signals on the display screen of the user interface 103. In a preferred embodiment, the processor/control subsection 102 may search the telephone directory stored in the memory 104 to find the caller's name corresponding to the telephone number included in the caller ID information, and if a matching name is found in the telephone directory, displays the name of the caller on the display screen of the user interface 103.

As can be appreciated, the above described mobile phone handset and methods provide versatile ways in which telephone calls may be made and/or received, and capabilities to communicate with various computing devices and networks.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A mobile phone handset comprising:

a multi-purpose connection adaptor configured to connect said mobile phone handset to at least one of a plain ordinary telephone line, a local area network and one or more computing devices;

a network controller configured to allow said mobile phone handset to communicate with said one or more computing devices, each of said one or more computing devices having a device network controller configured to communicate with said network controller using a network communication protocol;

a processor control subsection configured to control operations of said mobile phone handset; and a line detector configured to send said processor control subsection a local area network present signal if said connector is connected to said one or more computing devices.

2. The mobile phone handset according to claim 1 wherein said processor control subsection is configured to allow a user of said mobile phone handset to access a wide area network through a user interface of said one or more computing devices if said connector is connected to said one or more computing devices.

3. The mobile phone handset according to claim 1, further comprising:

a plain ordinary telephone transmitter receiver circuitry configured to send and receive telephone call signals to and from said plain ordinary telephone line.

4. The mobile phone handset according to claim 3, further comprising:

a processor control subsection configured to control operations of said mobile phone handset; and a line detector configured to send said processor control subsection a plain ordinary telephone line present signal if said connector is connected to said plain ordinary telephone line.

5. The mobile phone handset according to claim 4, wherein:

said processor control subsection is configured to, upon receiving said plain ordinary telephone line present signal, allow a user of said mobile phone handset to place a call through said plain ordinary telephone line.

6. The mobile phone handset according to claim 5, further comprising:

a memory having stored therein a telephone number directory; and a user interface having a display screen configured to display one or more records of said telephone number directory;

wherein said processor control subsection configured to allow said user of said mobile phone handset to dial a called party corresponding to said displayed one or more record without manually entering a telephone number of said called party.

7. The mobile phone handset according to claim 4, wherein:

said processor control subsection is configured to allow a user of said mobile phone handset to receive a call through said plain ordinary telephone line, and to display a caller identification information said user.

8. The mobile phone handset according to claim 1, further comprising:

a modem configured to communicate with said one or more computing device through said plain ordinary telephone line; and a line detector configured to send said processor control subsection a plain ordinary telephone line present signal if said connector is connected to said one or more computing device.

9. The mobile phone handset according to claim 8, wherein:

said processor control subsection is configured to allow a user of said mobile phone handset to access a wide area network through a user interface of said one or more computing devices if said connector is connected to said one or more computing devices.

10. The mobile phone handset of claim 1, wherein the multi-purpose connector comprises a connector socket, wherein the connector for the plain ordinary telephone line comprises a male plug, and wherein the connector for the local area network comprises a male plug.

11. The mobile phone handset of claim 10, wherein the male plug of the plain ordinary telephone line is an RJ-11 type male plug, and wherein the male plug of the local area network line is an RJ-45 type male plug.

12. The mobile phone handset of claim 10, wherein the connector socket is configured to securely hold the male plug of the local area network, and wherein the connector socket is further configured to securely hold the male plug of the plain ordinary telephone line.

13. The mobile phone handset of claim 1, and further comprising:

a line detector/modem/crossover unit configured to detect a signal received by the single multi-purpose connector and to identify signal type.

14. The mobile phone handset of claim 1, wherein the multi-purpose connection adaptor is incorporated within the mobile phone handset.

15. The mobile phone handset according to claim 1, further comprising:

a network controller configured to allow said mobile phone handset to communicate with said local area network.

16. The mobile phone handset according to claim 15, wherein:

said line detector configured to send said processor control subsection a local area network present signal if said connector is connected to said local area network.

17. The mobile phone handset according to claim 16, wherein:

said processor control subsection is configured to allow a user of said mobile phone handset to access said local area network through a user interface of said mobile phone handset.

18. A mobile phone handset, comprising:

a multi-purpose connector including a single connector socket adapted to alternatively accommodate a connector for a plain ordinary telephone line and a connector for a local area networks;

a network controller configured to allow said mobile phone handset to communicate with one or more computing devices though said local area network connector, each of said one or more computing devices having a device network controller configured to communicate with said network controller using a network communication protocol;

a processor control subsection configured to control operations of said mobile phone handset; and a line detector configured to send said processor control subsection a local area network present signal if said local area network connector is connected to said one or more computing devices.

19. The mobile phone handset according to claim 18, and further comprising:

a line detector/modem/crossover unit, wherein the line detector/modem/crossover unit is configured to detect a signal received by the multi-purpose connector and to identify signal type.

20. The mobile phone handset of claim 18, wherein the connector for the plain ordinary telephone line is an RJ-11 type male plug, wherein the connector for the local area network is an RJ-45 type male plug, and wherein the single connector socket is adapted to alternatively accommodate either of these types of male plugs.

* * * * *

UNITED STATES PATENT AND TRADEMARK OFFICE

CERTIFICATE OF CORRECTION

PATENT NO. : 6,909,908 B2
APPLICATION NO. : 09/776054
DATED : June 21, 2005
INVENTOR(S) : David M. Payne et al.

It is certified that error appears in the above-identified patent and that said Letters Patent is hereby corrected as shown below:

Column 2, line 35, delete “are” and insert therefor --area--

Column 2, line 40, delete “are” and insert therefor --area--

Column 10, Claim 18, line 36, delete “networks;” and insert therefor --network;--

Signed and Sealed this

Twelfth Day of December, 2006

JON W. DUDAS
*Director of the United States Patent and Trademark Office*